United States Patent
Miller et al.

(10) Patent No.: US 8,358,782 B2
(45) Date of Patent: Jan. 22, 2013

(54) METHOD FOR DISPLAYING A VIDEO OF A SCENE

(75) Inventors: Michael E. Miller, Honeoye Falls, NY (US); John N. Border, Walworth, NY (US); Christopher J. White, Avon, NY (US)

(73) Assignee: Eastman Kodak Company, Rochester, NY (US)

( * ) Notice: Subject to any disclaimer, the term of this patent is extended or adjusted under 35 U.S.C. 154(b) by 715 days.

(21) Appl. No.: 12/492,452

(22) Filed: Jun. 26, 2009

(65) Prior Publication Data

US 2010/0329457 A1 Dec. 30, 2010

(51) Int. Cl.
 *H04L 29/06* (2006.01)
(52) U.S. Cl. .................. 380/200; 380/210; 713/150
(58) Field of Classification Search .................. 380/200
 See application file for complete search history.

(56) References Cited

U.S. PATENT DOCUMENTS

| | | | |
|---|---|---|---|
| 4,535,355 A * | 8/1985 | Arn et al. ............... 380/212 |
| 4,769,292 A | 9/1988 | Tang et al. |
| 4,817,142 A * | 3/1989 | van Rassel ............... 380/212 |
| 5,010,405 A | 4/1991 | Schreiber et al. |
| 5,061,569 A | 10/1991 | VanSlyke et al. |
| 5,402,270 A | 3/1995 | McDonnell |
| 6,044,182 A | 3/2000 | Daly et al. |
| 6,937,362 B1 | 8/2005 | Spaulding |
| 7,242,850 B2 | 7/2007 | Cok |
| 7,320,134 B1 | 1/2008 | Tomsen et al. |
| 8,139,121 B2 | 3/2012 | Ito |
| 2004/0098579 A1 * | 5/2004 | Nakano et al. ............ 713/150 |
| 2004/0123135 A1 * | 6/2004 | Goddard ............... 713/200 |
| 2004/0213408 A1 * | 10/2004 | Kim et al. ............... 380/200 |
| 2005/0018854 A1 * | 1/2005 | Yamamoto et al. ......... 380/277 |
| 2006/0088161 A1 * | 4/2006 | Hashimoto et al. ......... 380/201 |
| 2007/0041443 A1 * | 2/2007 | Ha et al. ............... 375/240.15 |
| 2007/0177491 A1 * | 8/2007 | Honda et al. ............ 369/275.1 |

* cited by examiner

*Primary Examiner* — Edward Zee
*Assistant Examiner* — Yogesh Paliwal
(74) *Attorney, Agent, or Firm* — Christopher J. Whit

(57) ABSTRACT

Method of displaying a video of a scene onto a display with enhanced image quality, the video of the scene having first subframes and second subframes wherein the first subframes correspond to a first region of an image-presentation element of the display and the second subframes correspond to a second region of the image-presentation element; and selecting an access key corresponding to the first subframes. The method further includes encoding the access key into one or more of the second subframes; providing the second subframes to the display using a first data transport; the display, decoding the access key and receiving the corresponding first subframes using a second data transport different from the first data transport; and selectively providing the first and second subframes from the first and second data transports to corresponding regions in the image-presentation element of the display, whereby the displayed image has enhanced image quality.

10 Claims, 10 Drawing Sheets

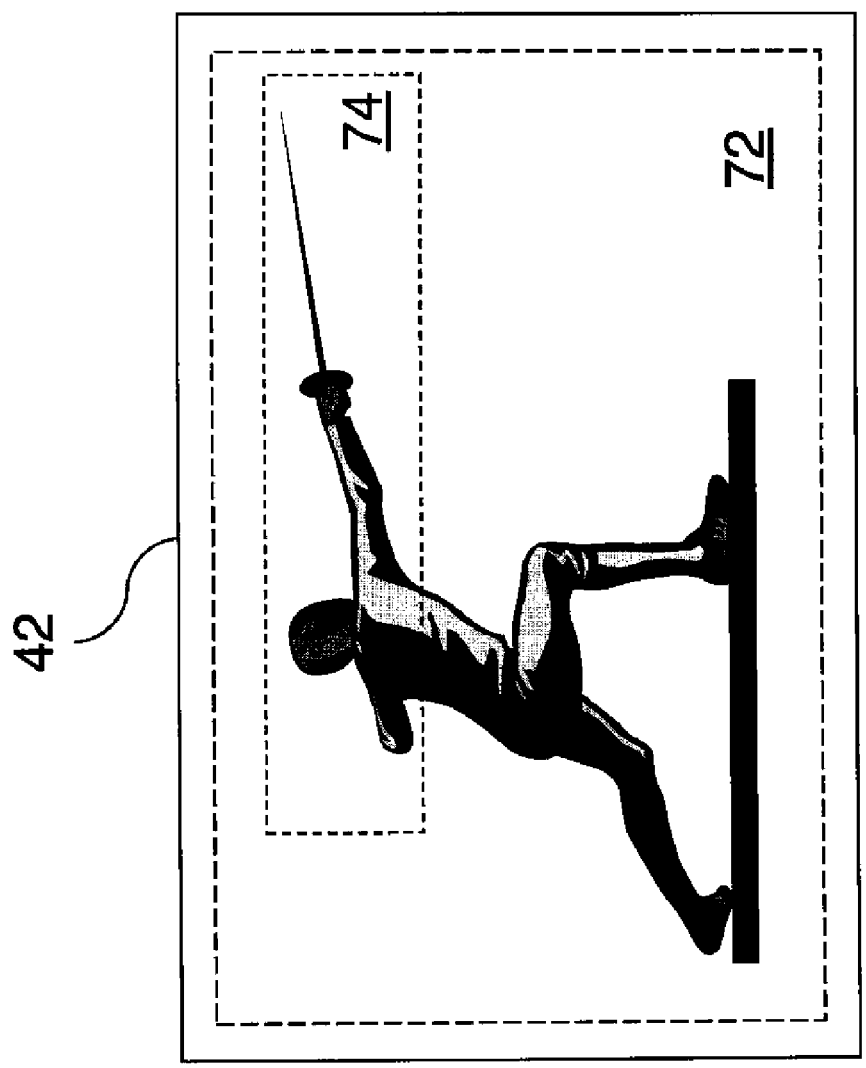

METHOD FOR DISPLAYING A VIDEO OF A SCENE

CROSS REFERENCE TO RELATED APPLICATIONS

Reference is made to commonly assigned U.S. patent application Ser. No. 12/401,633 filed Mar. 11, 2009, entitled CAPTURE OF VIDEO WITH MOTION, by John N. Border et al., and to U.S. patent application Ser. No. 12/402,577 filed Mar. 12, 2009, entitled DISPLAY OF VIDEO WITH MOTION, by Christopher J. White et al., the disclosures of which are incorporated herein.

FIELD OF THE INVENTION

The current invention provides a method for receiving and displaying a video with enhanced image quality.

BACKGROUND OF THE INVENTION

Rapid changes in hardware capability are occurring, thus making capture systems and displays available that have the potential for presenting very high quality image and video. For example, advancements include the ability to capture and display high frame rate information for reducing motion blur, capturing and displaying images with high dynamic range or extended color gamut, and the ability to simultaneously capture and display multiple perspective views of a scene.

Once content is captured, it is distributed, often to large communities, to be displayed. This distribution step can be expensive when significant changes are made to the information that is to be conveyed, especially since the specification and adoption of distribution formats and standards are time-consuming and expensive. For example, the adoption of digital television standards in the United States required decades of work.

It is known to store a digital image having a limited color gamut and extended color gamut information separately and then to reconstruct an image having extended color gamut information from these two sets of information. For example, Spaulding, et al. in U.S. Pat. No. 6,937,362, entitled "Method for providing access to an extended color gamut digital image and providing payment therefore" describe a method for storing a limited color gamut digital image and one or more residual images within a digital image file and later reconstructing a high dynamic range image from the limited color gamut digital image and the one or more residual images. Spaulding discusses a system in which a user is provided a preview of the image using the limited color gamut digital image and provided access to the reconstructed high dynamic range image only after providing payment for the high quality image. Such a method can provide higher quality information by encoding a lower quality image in a standard format and then encoding image enhancement information in a different format within the same file. However, as the limited color gamut image and the residual image necessary to reconstruct the image having extended color gamut information are stored in the same file, the residual images increase the size of the file containing limited color gamut image. As most standards and distribution media have fixed size or bandwidth, placing this information on the same distribution media is often not practical.

Similarly Schreiber et al. in U.S. Pat. No. 5,010,405, entitled "Receive-compatible enhanced definition television system" discusses a method of broadcasting a signal having a frequency range compatible with NTSC broadcast and a separate signal within a separate frequency range wherein the separate signal includes enhancement information. Once again, however, these two signals are provided within the same data transport mechanism and require the bandwidth of the transport mechanism be increased to support this additional information, requiring a modification of the existing standard. Lim in U.S. Pat. No. 5,402,270, entitled "Advanced television system" similarly discusses encoding HDTV resolution imagery and higher resolution imagery within different portions of a compressed file.

Tomsen et al. in U.S. Pat. No. 7,320,134, entitled "System and method for cable operator control over enhanced programming" describes a system in which standard video content is provided. However, the user can access other, non-video, content, for example, links to complimentary text or video information that is related to but not part of the video, thus providing an enhanced experience. Tomsen et al. acknowledges the source of the video can be separate from the source of the non-video content.

There is therefore a continuing need to provide a flexible and robust method for distribution of media that can be tailored to the performance characteristics of a user's display when different displays have significantly different performance characteristics. Such a method should permit the distribution of a standard quality video using standardized formats and media and simultaneously permit the video to take advantage of specialized characteristics of the user's display. This method should permit content to be distributed using standardized, backward compatible data transport mechanisms while simultaneously permitting a display capable of presenting information with enhanced image quality to access additional information and present images with enhanced image quality.

SUMMARY OF THE INVENTION

According to the present invention, there is provided a method of displaying a video of a scene on a display with enhanced image quality comprising:

a) providing the display with an image-presentation element;

b) providing the video of the scene with first subframes and second subframes wherein the first subframes correspond to a first region of the image-presentation element and the second subframes correspond to a second region of the image-presentation element;

c) selecting an access key corresponding to the first subframes;

d) encoding the access key into one or more of the second subframes;

e) providing the second subframes to the display using a first data transport;

f) the display, decoding the access key and receiving the corresponding first subframes using a second data transport different from the first data transport; and g) selectively providing the first and second subframes from the first and second data transports to corresponding regions in the image-presentation element of the display, so that the displayed image has enhanced image quality.

The method of the present invention obtains and displays a video of a scene on a display with enhanced image quality in a way that is compatible with existing video distribution standards and yet permits the display to obtain and display information with enhanced perceived image quality of the presented images. In some arrangements, this information is customized to the capability of the display, providing a method that provides this enhanced image quality using less of the bandwidth of the transmission medium than other approaches.

BRIEF DESCRIPTION OF THE DRAWINGS

FIG. 4C is an example of an image-presentation element of a display including a region with fast motion;

DETAILED DESCRIPTION OF THE INVENTION

Figure 1:
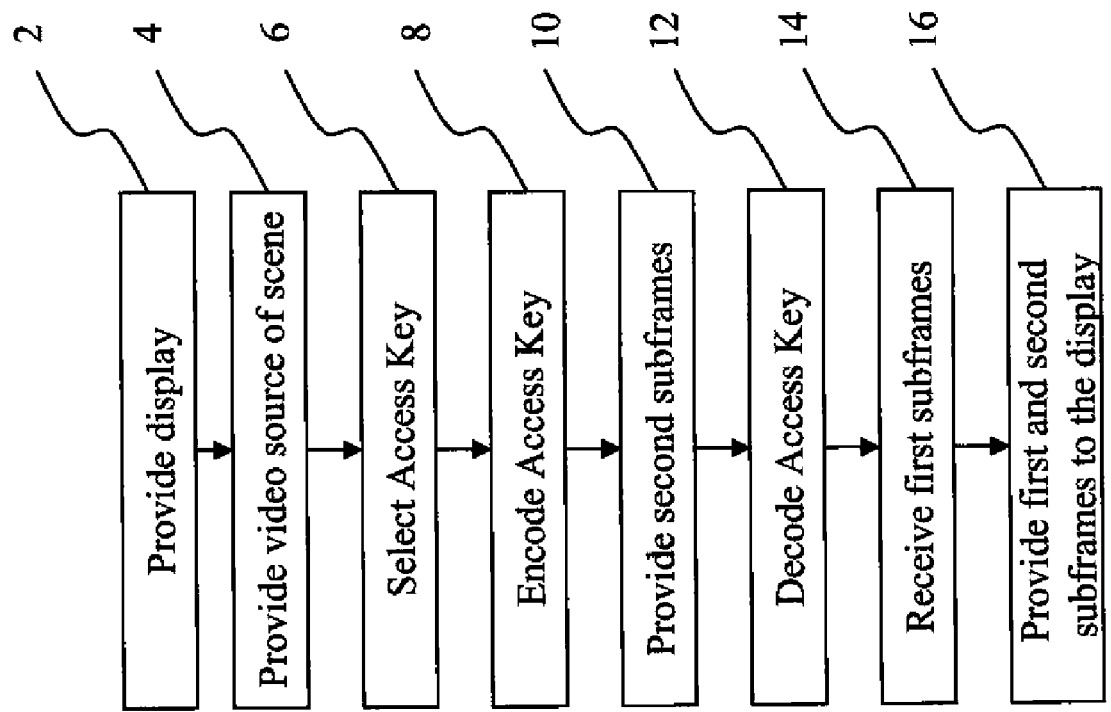
FIG. 1 is a flow chart providing the steps of an arrangement of the present invention.
Figure 2:
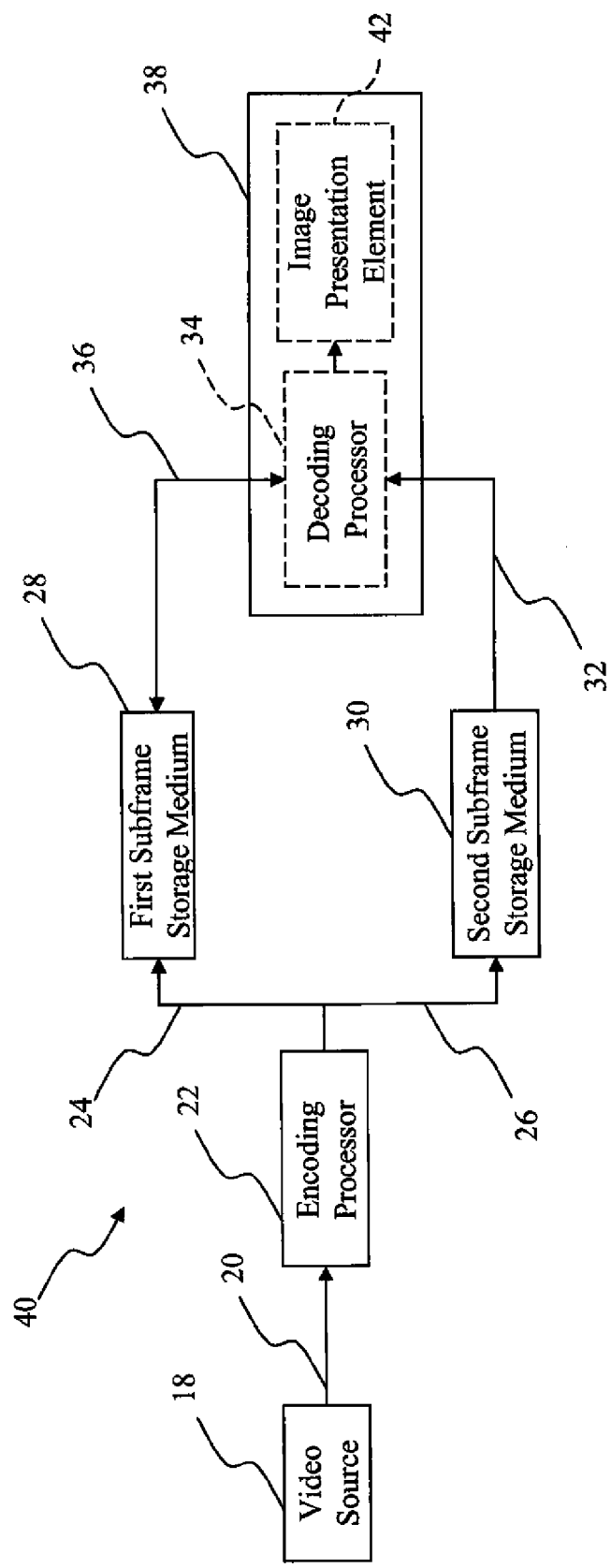
FIG. 2 is a schematic diagram depicting the elements of a system useful for performing the method of the present invention.

The present invention provides a method of displaying a video of a scene on a display with enhanced image quality. Referring to FIGS. 1 and 2, in one arrangement, a display 38 suitable for displaying video with enhanced image quality is provided 2. This display contains an image-presentation element 42. A video of a scene is provided 4 having first subframes and second subframes, wherein the first subframes correspond to a first region of the image-presentation element 42 of the display 38 and the second subframes correspond to a second region of the image-presentation element 42 of the display 38. An access key is selected 6, which corresponds to the first subframes. The access key is encoded 8 into the one or more of the second subframes. The second subframes are then provided 10 to the display using a first data transport 32. In the display 38, the access key is decoded 12 and the first subframes, corresponding to the second subframes are received 14 using a second data transport 36 different from the first data transport 32. In Step 12, the provider of the second subframes or the provider of the first subframes can require that a payment be provided by the user for access to the additional image content of the first subframes. The first and second subframes are then selectively provided 16 to corresponding regions in the image-presentation element 42 of the display 38, so that the displayed image has enhanced image quality. In various arrangements, the enhanced image quality can include reduced motion blur, 3D content, improved dynamic range, or increased color gamut. In some embodiments, the second subframes will include information for each region on the image presentation element and the first subframes will include additional information for a subset of regions on the image presentation element. In such embodiments, these first subframes will provide coordinates for the subset of regions and the display will use these coordinates to selectively provide the additional information of the first subframes to the image presentation element. This additional information will typically be either merged with the information in the second subframes prior to providing them to the image display element or provided to the image display element according to a temporal sequence such that they can be integrated by the visual system of the user.

Referring to FIG. 2, this method is performed in a system 40 including a video source 18 for providing a video 20 of a scene. An encoding processor 22 processes the video 20 of the scene to provide first 24 and second 26 subframes, which correspond to different regions of an image-presentation element 42 of a display 38. The encoding processor 22 additionally selects an access key corresponding to the first subframes 24 and encodes this access key into one or more of the second subframes 26. In some arrangements, the first and second subframes 24, 26 are stored on separate storage media or in separate locations 28, 30. For example, in one arrangement, the first subframes 24 are stored on a first subframe storage medium 28 such as a networked server. The second subframes are then stored on a second subframe storage medium 30, such as a standard video distribution medium (e.g., a Digital Video Disk (DVD)). In this example, the DVD is distributed to a user and played in any traditional DVD player for viewing on any display. When this DVD is played for viewing with a display 38 supporting the method of the present invention, the access key is decoded from within the second subframes by a decoding processor 34 of the display 38, after the second subframes are retrieved from the DVD over a first data transport 32.

The access key is provided to the first subframe storage medium 28 to access the first subframes through a second data transport 36 separate from the first data transport 32. In response to this access key, the appropriate first subframes corresponding to the second subframes are retrieved through the second data transport 36. The decoding processor 34 then provides the first and second subframes to corresponding regions in the image-presentation element 42 so that the final displayed image, including first and second subframes, has enhanced image quality. The display 38 can include localized storage for the decoding processor 34 to buffer first subframes, processed video, or other information before displaying the resulting video on the image-presentation element 42. In some arrangements, the display 38 is contained in a single housing, but is contained in multiple housings within other arrangements. For example, in an arrangement, the decoding processor 34 is located in a device, such as a set top box, and the image presentation element 42 is located in a display monitor. The display monitor and set-top box is connected, for example, with coaxial cables or other connection methods known in the art. In another arrangement, display 38 is a networked computer including decoding processor 34, with an internal image-presentation element 42 or an attached monitor containing the image-presentation element 42. In yet another arrangement, the decoding processor 34 and the image-presentation element 42 can each be enclosed within a digital television set. In an arrangement, the image-presentation element 42 is an electroluminescent (EL) or other high quality display device. In all arrangements of the present invention, the image-presentation element 42 has the capability to display the information within the first subframes. This display 38 thus has the ability to present video with enhanced image quality, which can include for example: a dynamic range of more than 3 decades, a peak luminance of 1000 cd/m$^2$ or greater, color gamuts near or higher than 100% of the area of the NTSC gamut, frame rates above 60 Hz, addressability greater than 1920 columns by 1080 lines or the capability to display stereoscopic information, including multi-view stereoscopic information providing more than two perspective views.

In the above arrangements, second subframes are stored on a second subframe storage medium 30 and provided on a first data transport 32, and first subframes are stored on a first subframe storage medium 28 and provided on a second data transport 36. In another arrangement, the first subframes or second subframes are streamed live across the second and first data transports 36, 32 respectively from the encoding processor 22. That is, the encoding processor 22 provides to the display 38 the second subframes over the first data transport 32 or the first subframes over the second data transport 36 without intervening storage media. In one example, the first and second subframes are streamed simultaneously across their respective data transports using methods known in the art for synchronization, such as MPEG-2 transport stream presentation timestamps.

First and second transports 32, 36 are mediums for transporting digital data and are now discussed. The first data transport 32 can include a physical medium, such as a DVD or Blu-Ray disk. The first data transport 32 or second data transport 36 can include coax or other cable transporting the video according to known standards such as ATSC, or a network connection transmitting video using known standards such as MPEG-2 TS video over RTP on an IP network. The second data transport 36 can preferably include a bidirectional network connection, providing additional flexibility in implementing the present invention. The first and second data transports can include different physical entities (e.g. a physical DVD and a network cable), or can both include the same physical entity (e.g. a single network cable carrying two different content streams). However, the requirement that the first and second subframes be provided on separate first and second data transports 32, 36 requires that the first and second subframes be acquired from logically separate sources. For example, in an arrangement, the first and second data transports 32, 36 are network connections over a single cable to respective servers in different physical locations.

Enhanced image quality includes any attribute of an image which enhances the perceived image quality of the image when displayed. Video images having enhanced image quality can include higher frame rates, higher dynamic range, larger color gamut, higher resolution, increased sharpness, reduced motion blur, simultaneous additional-perspective views to provide stereoscopic imagery, or combinations of these attributes.

Figure 4A:
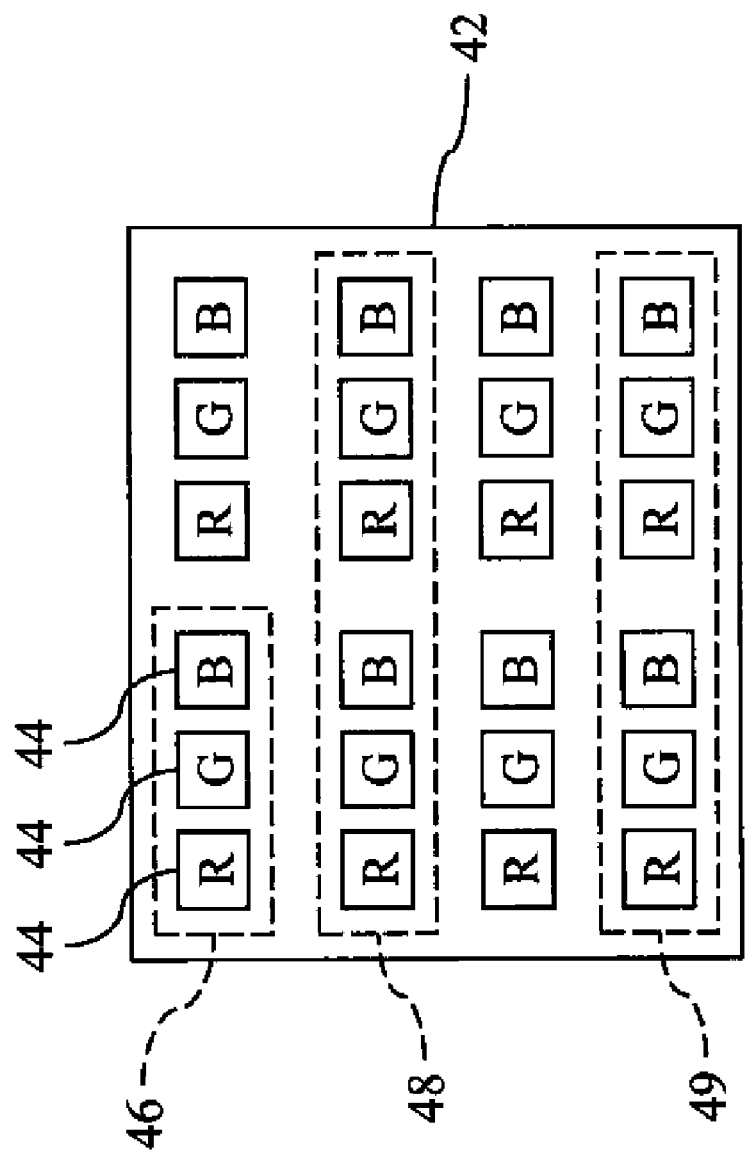
FIG. 4A is a diagram of subpixels on an image-presentation element.

Referring to FIG. 4A, image-presentation element 42 includes a plurality of subpixels 44 of one or more colors. The subpixels 44 are typically grouped into pixels 46. For example, each pixel can include a red, a green and a blue subpixel, and optionally also a broadband-emitting subpixel such as white or yellow. A region is a spatial area of the image-presentation element. For example, image-presentation element 42 can include regions 48, 49. A region can include all or a subset of the subpixels within a spatial area of the image presentation element 42. A region is a group of adjacent pixels in some arrangements. However, in other arrangements, a region is a group of pixels, some of which are separated from others by one or more pixels. Therefore, the first and second regions in this arrangement each include pixels within multiple spatial areas. In other arrangements, the first and second regions intersect spatially. Within other arrangements, the first region is a subset of the second region.

A frame is a set of data that represents the scene over a given time interval, wherein this time interval is typically between $\frac{1}{28}^{th}$ and $\frac{1}{60}^{th}$ of a second. The frame rate is the reciprocal of the frame time interval (e.g. 60 Hz). A subframe is a set of data that represents a portion of the scene, either a portion of the spatial area of the frame or a portion of the time interval.

The update rate is the rate at which image data or video signals are changed and provided to the subpixels within a spatial area of the display. The update rate equals the frame rate when the image data or video signals to the display are changed every time a new frame of data is provided. However, in some arrangements, a region of the display is updated multiple times with the same frame data, and therefore the update rate is greater than the frame rate.

The input rate for the first or second subframes is the rate at which the first or second subframes are presented to the image presentation element 42.

The present invention advantageously provides a displayed image with enhanced image quality. The enhanced image quality is advantageously achieved in a way compatible with existing standards and distribution methods. That is, within preferred arrangements, the second subframes are distributed using existing video standards and are backwards compatible with existing distribution media, such as DVDs, Blu-Ray Disks, or broadband distribution system (e.g. cable). However, systems employing the method of the present invention can access the first subframes from other sources, such as from networked servers. The first subframes can require significantly less storage or transmission bandwidth than the second subframes and be easier to transport over networks than the second subframes, or the entire enhanced video resulting from combining the first and second subframes. Further, under circumstances where the source of the first subframes is not available, the system can display a video using the second subframes alone, although at a lower quality than would be possible if the first were available for presentation.

In some arrangements, the provider of the first subframes charges additional fees for the service of delivering these first subframes. Therefore, the encoding step 8 can include selecting a first encryption key and encrypting the access key with the first encryption key. Further, the decoding step 12 can include selecting a second encryption key and decrypting the access key with the second encryption key. The first and second encryption keys in some arrangements are the same but are different in others. Encryption (e.g. public-or private-key ciphers known in the cryptography art) or other forms of access control (e.g. hashing with a unique ID assigned to a display 38) are applied to prevent unauthorized access to the access key.

Alternatively, the access key can be transmitted freely to all receivers of the second subframes, and the provider of the first subframes can apply access control directly to the first subframes, e.g. using passwords transmitted by the display 38. For example, a content server is applied as the first subframe storage medium 28 and connected to the second data transport 36 for providing the first subframes to the display 38. The receiving step 14 in FIG. 1 can then include providing selected credentials to the content server (e.g. first subframe storage medium 28) using the second data transport 36.

The access key is any global identifier for the first subframes that permits the retrieval of the first subframes corresponding to the access key. For example, the access key can include a 128-bit globally-unique ID value (GUID), Uniform Resource Identifier (URI), Uniform Resource Locator (URL), Digital Object Identifier (DOI), or other unique identifier known in the art.

The access key can preferably be encoded in the second subframes in such a way that it is compatible with existing video standards. In one arrangement, the access key is encoded in a metadata stream within the second subframes that are provided within a video standard, e.g. MPEG-2 Systems private data (ISO/IEC 13818-1:2007(E) Annex H). In an alternative arrangement, the access key is encoded and stored within a blanking interval of the one or more second subframes, as e.g. closed-captioning data are transported. In yet another arrangement, the access key is steganographically encoded in one or more of the second subframes during the encoding step 8 in FIG. 1 as is known in the steganographic art. Steganographic encoding of the access key within the image data permits the decoding processor 34 to retrieve the access key from the image data without presenting the encoded access key as a visible marker in the displayed image.

In an arrangement of this invention, the access key is encoded as a frequency-dispersed data image within the video image data of one or more second subframes as described in commonly-assigned U.S. Pat. No. 6,044,182 to Daly et al. As set forth within one arrangement in this reference, a spatially-dispersed data image is embedded in a given source image invisibly to a viewer by selecting a binary message representing given digital data, forming the message into a 2-D data image e.g. by using a raster pattern to convert the binary message to a data image, convolving the data image with a carrier image to form a frequency-dispersed data image (FDDI), and adding the FDDI to the source image. The carrier image is a linear or log chirp rotated around a center point within particular arrangements. Multiple copies of the FDDI is filed and added to the source image to improve redundancy. According to this arrangement of the present invention, the source image is the image data for a second subframe. The binary message can include the access key. For example, the 128 bits of a GUID access key is the binary message. The binary message is formed into a data image e.g. by rasterizing MSB to LSB, left-to-right, top-to-bottom. For example, a 128-bit GUID is rasterized into a 16×8 data image, two copies of which is tiled together vertically to make a square, 16×16 data image. As described by Daly et al., the binary message can include an identification code that does not occur in the digital data, and error-correction coding is used. According to an arrangement of the present invention, a 4b5b code as known in the art is employed to convert the digital data into the binary message, and a 4b5b value not corresponding to a valid four-bit data string is used as the identification code.

The primary purpose of the access key is to provide the display with information regarding the location of the first subframe(s) to permit these first subframe(s) to be acquired and synchronized or merged with the second subframes for presentation. The access key can then either be formed to include a direct or indirect address for the first subframes. When formed as a direct address, the first subframes will be provided in a known physical location and the access key will be formed to include this known physical location. In such an instance the known physical location can be provided as a URL for a server and the physical address of the first subframe on the server. In other embodiments, a database can be formed and the access key can be formed to include the physical address of the database, as well as an identifier for providing a lookup within the database, which identifies one or more physical locations from which the first subframes can be acquired. In some instances, the access key within any second subframe will be formed to include at least one of two distinct pieces of information, including a direct or indirect address for a group of first subframes or a frame identifier. An initial second subframe can preferably include an access key that includes the direct or indirect address for a group of first subframes, and subsequent second subframes can preferably include frame identifiers for accessing and synchronizing first subframes with the second subframes as the first subframes are received. Indirect addresses can include keys in a known database, and entries within the database can be formed in a number of ways, including sequential numbering. Indirect addresses can also include one or more digital object identifier(s) (DOI(s)), and the location of the first subframes can be acquired by resolving the DOI(s), as known in the art. Other indirect addressing schemes known in the art can be employed with the present invention.

Displays 38 can have image-presentation elements 42 that vary significantly from one another. For example, standard HDTV receivers sold commercially have fixed performance parameters that are compatible with the HDTV standard. However, a more advanced display can provide an image having high dynamic range (i.e., a contrast ratio with greater than 100,000:1, optionally using 12 or more bits of information), high frame rates (i.e., effective frame rates significantly greater than 60 Hz) or 3D display (e.g., the ability to present stereoscopic imagery, optionally including multiple perspective views) or combinations of these features. These features are specified as parameters of the display, which designate the performance of the display. These display parameters can indicate whether a feature (e.g. high dynamic range) exists, and optionally also the quality of this feature (e.g., the contrast ratio and the number of bits that are supported within the high dynamic range of the display).

Referring back to FIG. 1, in one arrangement, the method of the present invention accommodates different displays with different capabilities by providing 4 a video source of the scene having multiple first subframes, with each of the first subframes containing information to enhance image quality in a different way. The receive first subframes step 14 includes determining the first subframes that were rendered for a display having display parameters corresponding to one or more of the parameters of the provided 2 display and receiving the selected first subframes. In this way, multiple groups of first subframes are made available with each group corresponding to the first subframes necessary to present a video on a display having a particular set of display parameters and the display is then able to retrieve the group of first subframes that were rendered to support a display having display parameters that are similar to the display parameters of the target display. In this arrangement, multiple access keys are included with the second subframes, each corresponding to a different group of first subframes. In an alternative arrangement, a single access key is used, and the first subframe storage medium (FIG. 2 28) receives parameters from the display and provides only the group of first subframes corresponding to both the access key and the received display parameters.

Figure 3:
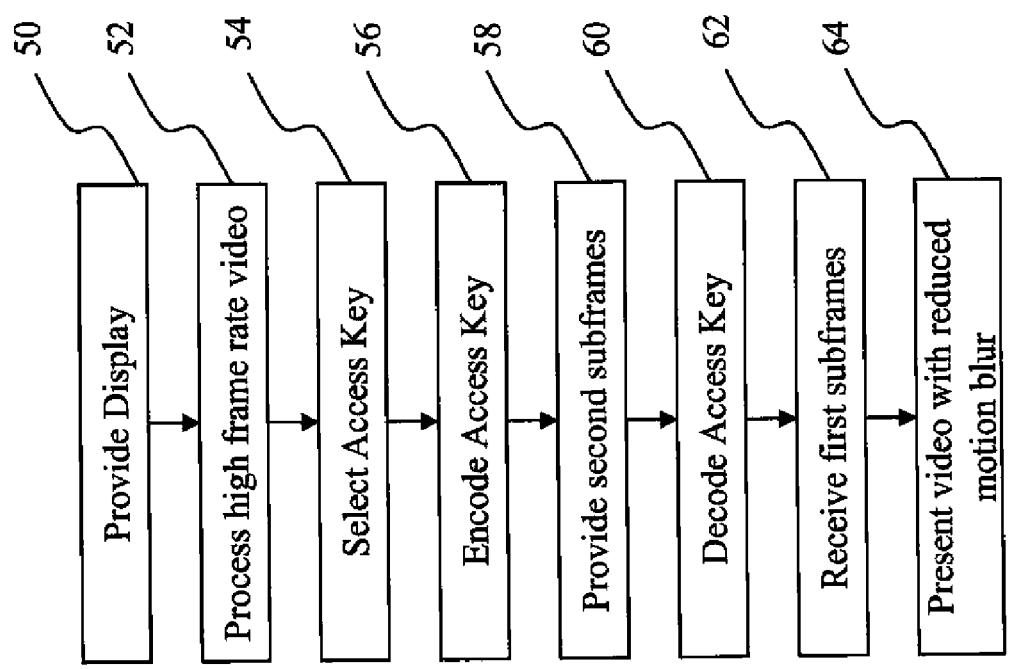
FIG. 3 is a flow chart providing the steps of an arrangement of the present invention for presenting an image with reduced motion blur.

Referring to FIG. 3, in one arrangement, the present invention presents an enhanced video of a scene on a display with reduced motion blur. A display is provided 50 having an image-presentation element. An original video of a scene is processed 52 to provide an enhanced video of the scene having first subframes that have a first input rate and second subframes that have a second input rate wherein the first subframes correspond to a first region of the display and the second subframes correspond to a second region of the display. An access key is selected 54 corresponding to the first subframes. The access key is encoded 56 into one or more of the second subframes. A first data transport is used to provide 58 the second subframes. In the display, the access key is decoded 60 from the second subframes and is used to access the corresponding first subframes, selectively causing the first subframes to be received 62 using a second data transport different from the first data transport. The display then presents 64 a video including the first and second subframes on an image-presentation element of the display so that the combined presented first and second subframes reproduce an enhanced video with reduced motion blur.

This method is particularly useful when the first subframes are presented in the first region of the image-presentation element of the display with a first update rate and the second subframes are presented in the second region of the image-presentation element of the display with a second update rate, wherein the first update rate is greater than the second update rate. For example, referring to FIG. 4B, the scene to be viewed on the image-presentation element 42 can include a video of a person fencing, wherein the fencer's arm and the foil are moving rapidly and as a result, those portions of the displayed video image are blurred when the entire image presentation element 42 is updated at typical update rates, for example, 60 Hz. In an arrangement of the invention, a video signal of the scene is provided to the image presentation element 42. This video signal has first subframes that have a first input rate $I_1$ and second subframes that have a second input rate $I_2$. The input rates are measured in Hz. First and second subframe input times $J_1$, $J_2$, measured in seconds, are then defined as:

$$J_1 = 1/I_1; J_2 = 1/I_2.$$

The first subframes provide information corresponding to a first region 74 of the image presentation element 42, which corresponds to an area of the display on which fast motion is displayed. The first subframes have a first input rate, for example 120 Hz. The second subframes correspond to a second region 72a, 72b, of the image presentation element 42 corresponding to an area of the display on which images without fast motion are displayed. These second subframes 72a, 72b can, for example, have a second input rate of 60 Hz.

Figure 4B:
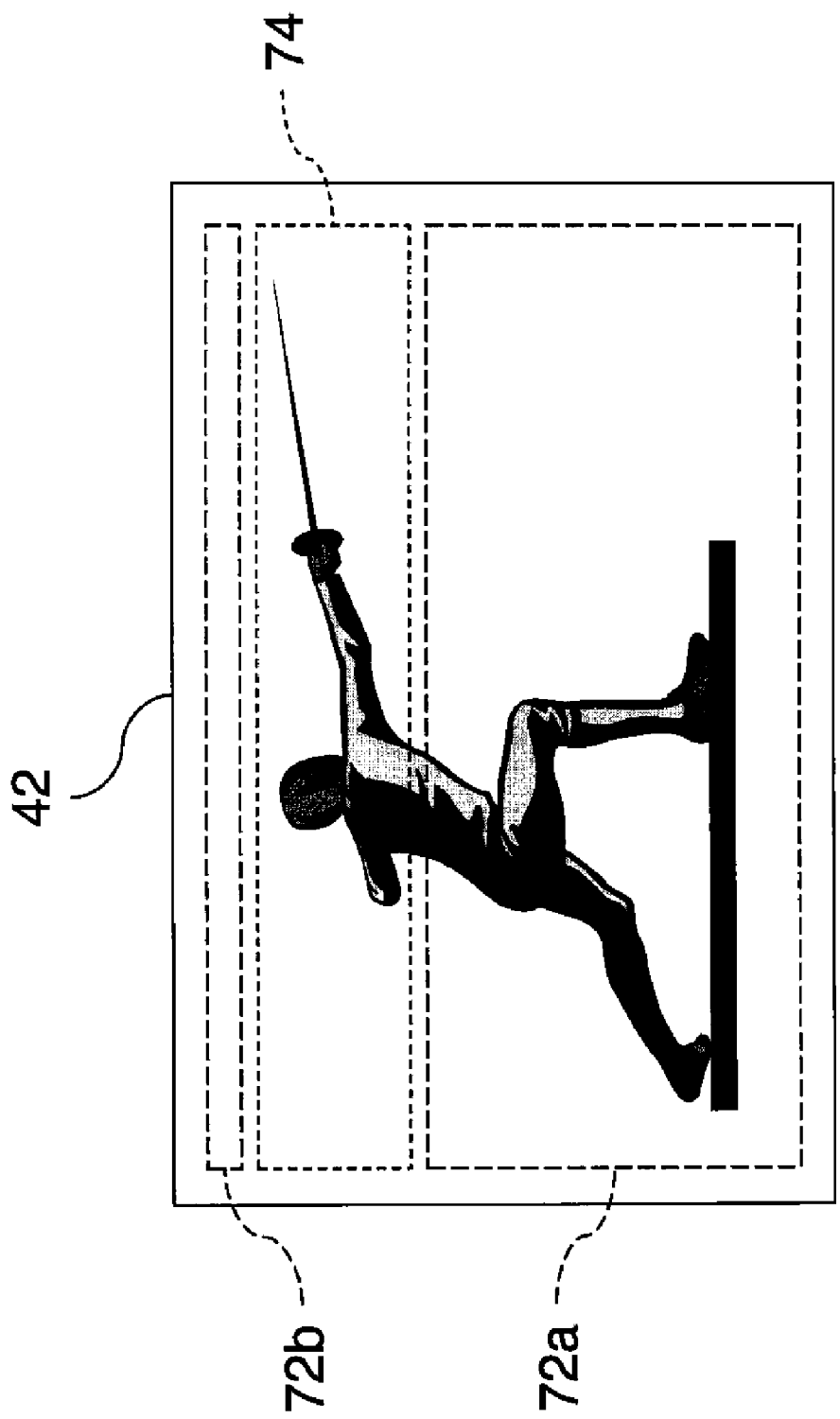
FIG. 4B is an example of an image-presentation element of a display including regions with fast motion and regions with slow motion.

While FIG. 4B shows a specific arrangement of the first region 74 and second region 72a, 72b, it will be understood by those skilled in the art that the locations and sizes of the first and second regions depend on the content of the displayed video image. Furthermore, FIG. 4B shows first region 74 and second region 72a, 72b having a separation between them. This is for clarity in the figure. According to the present invention, every subpixel 44 of image presentation element 42 is included in the first region, the second region, or both, as described above.

In this arrangement, the original video of the scene is processed 52 to provide first and second subframes. The original video is a high frame rate video having a frame rate greater than 60 Hz, or a video with variable frame rate having a high frame rate greater than 60 Hz for at least some regions of the scene. In the processing step 52, the relative speed of motion within a first region of the video of the scene is determined with respect to the speed of motion within a second region of the video of the scene, the update rate for the second regions of the video are then provided at 60 Hz or less. In an alternative arrangement, the original video is produced by a system for capturing a video of a scene depending on the speed of motion. Such a system can employ a method, including: capturing a video of the scene, determining the relative speed of motion within a first region of the video of the scene with respect to the speed of motion within a second region of the video of the scene; and causing a capture rate of the first region of the video of the scene to be greater than a capture rate of the second region of the video of the scene, or causing an exposure time of the first region to be less than exposure time of the second region. Alternatively, the original video can also be synthesized or computer generated to have a high or adjustable frame rate. For example, the original video is computer-generated from a virtual world such that the frame rate for various regions within the output video is dependent upon the rate of motion of objects within the corresponding regions.

Referring to FIG. 4C, in an embodiment of the present invention, image presentation element 42 has a second region 72 including every subpixel in image presentation element 42. That is, the whole display contains data updated at the slow rate. First region 74 is updated at a faster rate, but is also updated at the slow rate, as all the subpixels in first region 74 are also in second region 72.

The total input rate $I_t$ is the rate, in Hz, at which new information is provided to first region 74 of image presentation element 42. When the first and second regions overlap wholly or partially, the total input rate for the overlapping area is constrained as follows:

$$\min(I_1, I_2) \leq I_t \leq I_1 + I_2$$

That is, the total input rate is less than or equal to the sum of the first input rate and the second input rate but equal to or larger than the smaller of the first or second input rates. The exact value of the total input rate when subframes are delivered periodically depends on $I_1$ and $I_2$ and a phase relationship $\Phi$ between the first and second subframes.

In some embodiments, $I_1 = nI_2$ for some integer $n>1$. Phase relationship $\Phi$ can then be expressed in degrees or radians by dividing the time from a second subframe to the next first subframe by $J_2$ and multiplying by 360°. When $\Phi=0°$, first and second subframes are in phase. Every second subframe thus arrives at the same time as a first subframe. In this case the total input rate is equal to the higher of the first and second input rates. When $\Phi \neq 0°$, the first and second subframes are out of phase, meaning every second subframe arrives at a different time than every first subframe. In this case the total input rate is equal to the sum of the first and second input rates. For example, when $\Phi=180°$, the total input rate is equal to the sum of the first and second input rate.

In some embodiments, $I_1 \neq nI_2$ for all integers $n>1$. The first and second input rates thus beat together, and $$I_t = I_1 + I_2 - (I_1 - I_2), \text{ for } I_1 > I_2.$$

That is, the total input rate is equal to the number of times per second either the first or second region is updated, since the total input rate corresponds to the overlap between the two regions, minus the number of times per second the two regions update simultaneously (which is the beat frequency term $I_1 - I_2$). When the regions update simultaneously, the overlapping area can be updated with data from either region, as the two have equivalent content.

Subframes can also be delivered aperiodically. For example, the first subframes can each require different time intervals, or the first subframes can be delivered within the period other than that in which the second subframes are delivered. The total input rate, which corresponds to the first region, is always greater than the second input rate. For example, when the second subframe corresponds to the entire display, the first subframes are stored to provide data intermediate to the second subframes within the temporal domain, providing a total input rate for the first region of 180 Hz when the second subframes are delivered at a rate of 60 Hz and the first subframes are delivered at a rate of 120 Hz between successive second subframes ($\Phi \neq 0$).

In embodiments in which second region 72 includes every subpixel in image presentation element 42, the original video is processed to extract second subframes, which include the entire frame of the original video, at a first frame rate. This processing can include selecting a subset of the frames or providing a temporally filtered or interpolated version of intermediate frames within the original video. The intermediate frames represent the fast motion present in the video, as determined by subtracting sequential video frames or subtracting sequential second subframes. The first subframes are selected to include portions of the original scene that have high rates of motion. These first subframes are determined by subtracting the second subframes from the intermediate frames within the original video of the scene. In areas without motion, the difference between the pixel values in the second subframes and the pixel values for the intermediate frames of the original video will be very near zero. These values very near zero are disregarded. In areas containing rapid motion, the difference between the second subframes and the intermediate frames will differ significantly from zero. These regions are described in terms of coordinates defining the boundary of the region containing these values and the resulting difference values. These coordinates and difference values are recorded as first subframes. The first subframes are stored in a location and information that permits the relative coordinates of these first subframes, the frame of video from which they are calculated, and the location of the first subframes are used to select 54 the access key. Note that it is possible to store multiple groups of subframes. In one example, if the original video is provided at a rate of 240 Hz and the second subframes are provided at a rate of 60 Hz, one group of first subframes are formed for display on a 120 Hz display. However, a second group of first subframes can further be formed for display on a 240 Hz display. Separate keys are provided which permit each of the groups to be selected among within some arrangements.

The access key (or keys) is then encoded 56 in the second subframe as described above. The second subframe can then be stored or transmitted. The second subframes are then provided 58 to a decoding processor associated with the display. This processor will decode 60 the access key within the second subframes and use the information associated with the access key to provide an access request for the first subframes. The processor can use information associated with the display to selectively cause the first subframes to be received 62 from a data transport that is different than the one used to transport the second subframes. For instance, if the second subframes are stored at 60 Hz, the first subframes are stored to correspond to either a 120 or 240 Hz video and the display is capable of displaying 120 Hz video, the decoding processor can selectively cause the corresponding first subframes to be received which have the 120 Hz frame rate supported by the display and that are synchronized with the second subframes. Once the first subframes are received 62 they are processed to recover the high frame rate video, that is, to provide a high frame rate video or separate first and second subframes to the image-presentation element 42.

When the image-presentation element receives the video having first subframes that have a first input rate and second subframes that have a second input rate, where the first subframes correspond to a first region of the image-presentation element and the second subframes correspond to a second region of the image-presentation element, the first and second subframes are selectively provided to corresponding regions in the image-presentation element. This is accomplished such that the first region of the image-presentation element is updated with a first update rate and the second region of the image-presentation element is updated with a second update rate, wherein the first update rate is greater than the second update rate, so that the displayed image has reduced motion blur. In one arrangement, the second subframes are scanned out over the entire image-presentation element and circuitry within the image-presentation element holds the signals associated with the second subframes while the image-presentation element receives the first subframes and the first subframes are scanned out over regions associated with the first subframes. By holding the information in the regions outside the regions associated with the first subframes while updating the regions of the image-presentation element corresponding to the regions of the first subframes, the regions of the image-presentation element associated with the regions of the first subframes are updated at a higher frequency than the regions of the image-presentation element associated with the regions of the second subframes.

The first and second subframes are then presented 64 on the display so that the combined presented first and second subframes produce an enhanced video with reduced motion blur. For example, the first and second subframes are selectively provided to corresponding regions 74, 72a, 72b of the image-presentation element 42. The first region 74 of the image presentation element 42 is then updated with a first update rate and the second region 72a, 72b of the image presentation element 42 is updated with a second update rate wherein the first update rate is greater than the second update rate. For example, the first update rate is equal to the total input rate for the first region and the second update rate is equal to the second input rate. Therefore, the update rate of region 74 is increased where the fencer's arm and the foil are located in the image shown in FIG. 4b to reduce blur caused by the rapid motion of the fencer's arm and foil. In contrast, the update rate for regions 72a and 72b is slower where the motion of the fencer's body is relatively slow and is formed from second subframes alone without blur.

Figure 5:
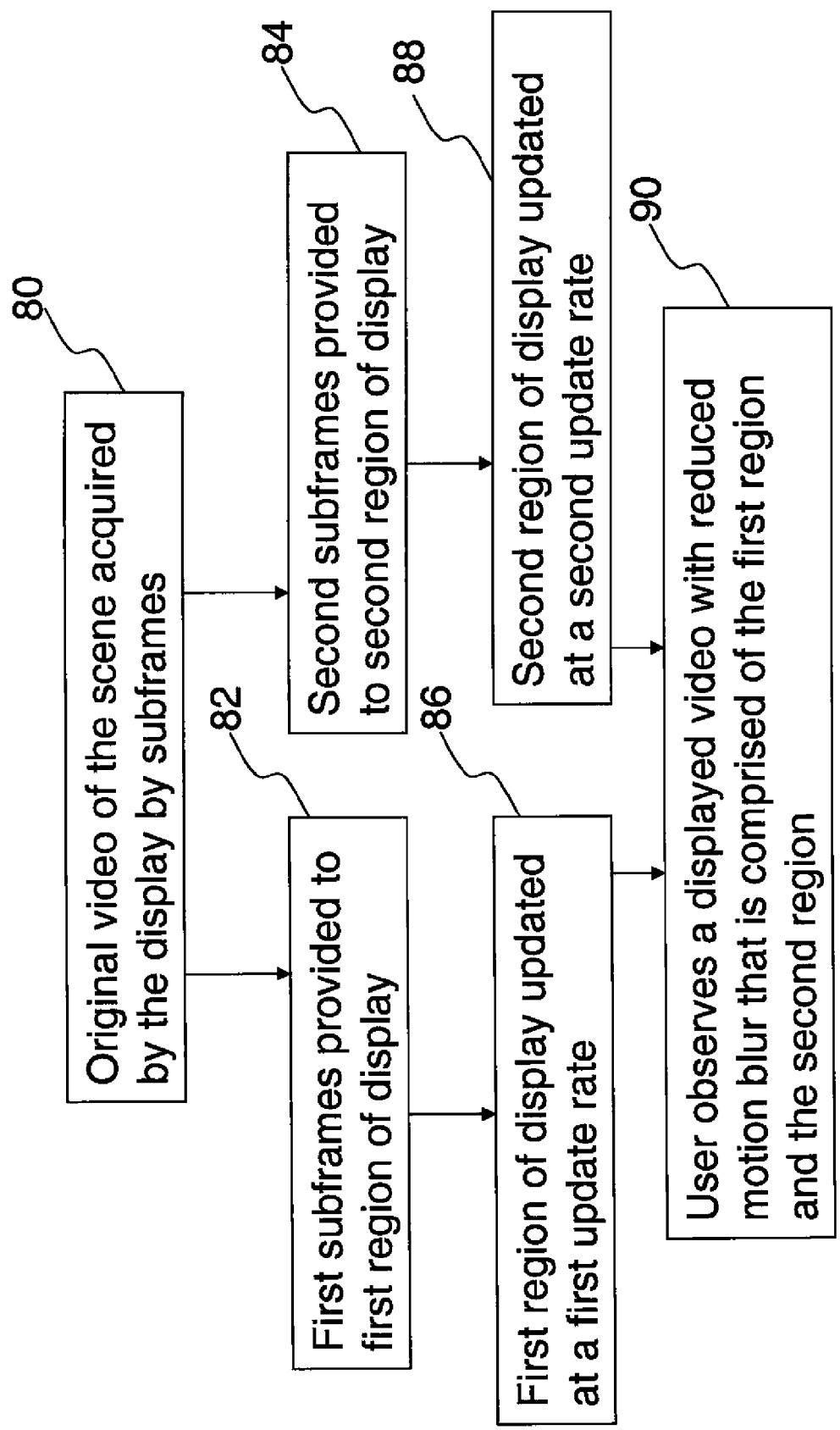
FIG. 5 is a flow chart providing the steps for presenting an image on a display with reduced motion blur.

Referring to FIG. 5, in one arrangement, the video of the scene is acquired 80 by the display by subframes. First subframes are provided 82 to the first region of the display. The first region of the display is updated 86 at a first update rate. The second subframes are provided 84 to a second region of the display and the second region of the display is updated 88 at a second update rate. The user then observes 90 a displayed video with a reduced motion blur, the displayed video including the first and second regions of the display.

Figure 6:
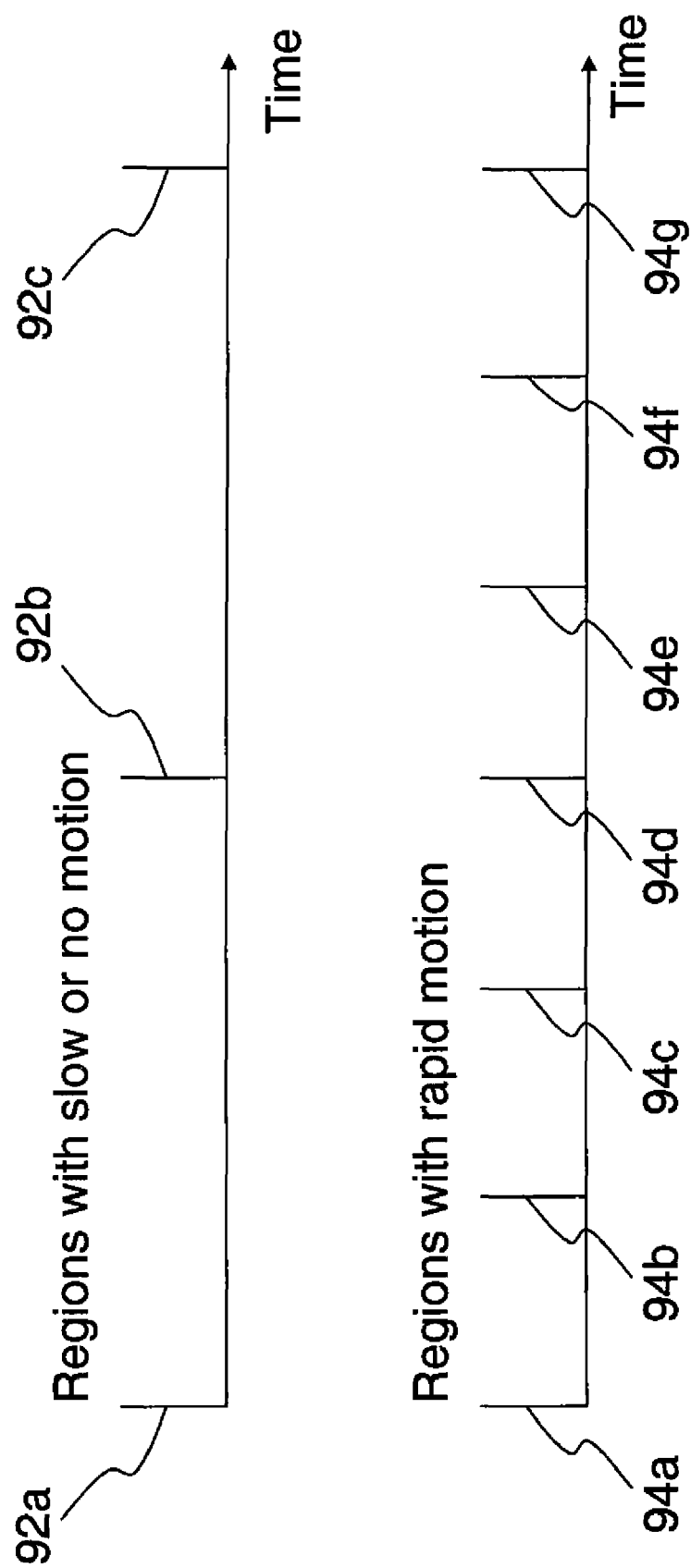
FIG. 6 is a timing diagram showing the onsets of updating first and second regions of an image-presentation element having reduced motion blur.

In another arrangement, the first region 74 of the image-presentation element 42 to which the first subframes correspond is a subset of the second region 72a, 72b of the image-presentation element 42, the first region 74 of the image presentation element 42 has a corresponding total input rate, where the total input rate is greater than or equal to the larger of the first input rate corresponding to the rate at which first subframes are presented and the second input rate at which the second subframes are presented, and the total input rate is greater than the second input rate. Referring to FIG. 6, timing pulses 92a, 92b, 92c, 94a, 94b, 94e, 94d, 94e, 94f, 94g show the onset of display updates for both regions with slow or no motion, the data of which is provided within the second subframes, and regions with rapid motion, the data for which is provided within the first subframes or is included in the first and second subframes. As shown, image information is updated on the image presentation element 42, such that the regions containing slow or no motion are updated 92a, 92b, 92c synchronously with regions containing rapid motion, as indicated by timing pulses 94a, 94d, and 94g, which are synchronous with the timing pulses 92a, 92b, and 92c. However, the image information is updated at additional intervals in the regions with rapid motion as indicated by timing pulses 94b, 94c, 94e, and 94f.

In another arrangement, a display according to the present invention can provide images with increased dynamic range or increased color gamut. For example, the original video can have an expanded dynamic range, represented by a fixed number of bits, for example 16 bits, However, most existing video standards support fewer bits, commonly 8 bits. Therefore, for the second subframes to be backward-compatible with existing standards, the second subframes can have fewer bits than the video of the scene that is provided. Therefore, the video of the scene is processed to compress the dynamic range of the scene when forming the second subframes. In an arrangement, this is accomplished by selecting the 8 highest order bits or by performing additional processing, often including tonescale manipulation or spatial filtering operations on the video of the scene as known in the art, and then selecting the 8 highest-order bits. These tonescale manipulations can compress information within the highlights and shadows within the video of the scene such that the detail within these regions is reduced. First subframes are produced by processing the resulting second subframes through inverse tonescale manipulations and subtracting the frames from the video of the scene. Such a manipulation will result in values that are near or equal to zero for much of the scene but significantly different from zero within the highlight and shadow areas of the video of the scene. A portion of the video with values significantly different from zero will be used to form a first subframe.

In another arrangement, expanded color gamut information, corresponding to the second subframes is encoded and stored within a first subframe. In one arrangement, the first and second regions are the same and the first subframes provide expanded color gamut information for all pixels in the second subframes. In certain arrangements using multiple types of image enhancement (e.g. both high dynamic range and expanded color gamut information), the first subframes contain both image enhancement types. Alternatively, different first subframes are provided or selected based upon access key or display parameters and then provided for each type or combination of types of image enhancements. In some arrangements, the provider of first subframes will require additional payments from the user for the access of the additional image information contained within the different first subframes and as based on display parameters that determine which of the different first subframes the user's display is permitted to receive.

Figure 7:
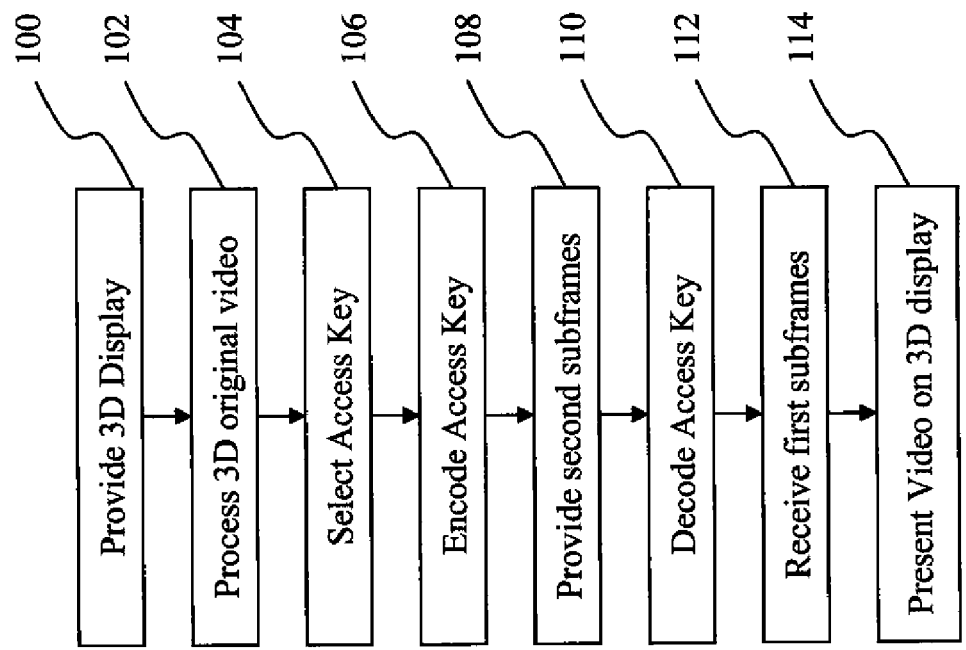
FIG. 7 is a flow chart providing the steps of an arrangement of the present invention useful for presenting a 3D image.

Referring to FIG. 7, a 3D video of a scene is presented on a display 38 (shown in FIG. 2). A 3D display is provided 100 having an image-presentation element 42 (shown in FIG. 2) capable of providing a 3D image. This image-presentation element 42 is capable of providing at least two perspective views of a scene and will ideally provide multiple perspective views of a scene. Such displays are well known in the art and are created using multiple technologies to create either a simple stereo display having only two perspective views but can further provide multi-view stereo, providing for multiple, often 10 or more, perspective views.

A 3D original video of the scene is processed 102 to provide the 3D video of the scene having first subframes that have 3D content and second subframes that have 2D content. For example, the image-presentation element 42 of the display 38 can support multiple perspective views. The second subframes provide information corresponding to a single perspective view. The first subframes contain information corresponding to at least one additional perspective view.

Note that the information between a first and a second perspective view is typically highly correlated. Therefore, the second subframes will typically provide all of the information necessary to render a first perspective view. However, the first subframes will typically rely on the correlation between perspective views of any individual frame in the video to provide a first subframe that will rely upon the information within the second subframe to construct the additional perspective views. Thus, the information in a first subframe corresponding to one additional perspective view will typically require significantly less storage or transmission bandwidth than the second subframe. This attribute of the first subframes permits these first subframes to be transmitted with significantly less bandwidth than the second subframes, requiring the bandwidth of the first transport 32 (shown in FIG. 2) to be significantly less than the bandwidth of the second transport 36 (shown in FIG. 2). Therefore, if the first transport 32 is a physical storage medium, such as a DVD and the second transport 36 is a cable or internet connection, the bandwidth of the cable or internet connection is typically substantially lower than is required to transmit the second subframes.

An access key is selected 104, corresponding to the first subframes and this access key is encoded 106 into one or more of the second subframes. A first data transport 32, for example a DVD) or a streaming video server is then used to provide 108 the second subframes to the display. In the display, the access key is decoded 110 from the second subframes and is applied to selectively cause the corresponding first subframes to be received 112 using a second data transport different from the first data transport. Finally, the first and second subframes are applied to present 114 the video on the image-presentation element of the display so that the combined presented first and second subframes reproduce the 3D video.

Within embodiments of the present invention, a first subframe includes information for rendering a second, third or any number of additional perspective views of the scene. Alternative embodiments provide a second additional perspective view of the scene within the first subframe and additionally provide additional subframes for providing information corresponding to additional perspective views.

The diversity of 3D display technologies presents a barrier to the adoption of the technology since providing a high quality rendering of a scene on a 3D display involves a different process when the display supports only two perspective views or a larger number of perspective views. Additionally, display parameters, such as the amount of crosstalk between displayed perspective views, viewing distance, and display size significantly influence the process required to render high quality 3D video on these displays. Therefore, different standards are required for different 3D displays, or a single standard is required with enough flexibility to permit multiple renderings of the various perspective views on these displays.

It is useful to provide different renderings of 3D video for each display technology. Further, different renderings are useful depending upon other display parameters, including the resolution, size, and viewing distance of any display. Specifically, it is useful to adjust at least the disparity or offset of an object in a first perspective view in relation to the same object in a second perspective view dependent upon the display technology, resolution, size, and viewing distance of the display.

Figure 8:
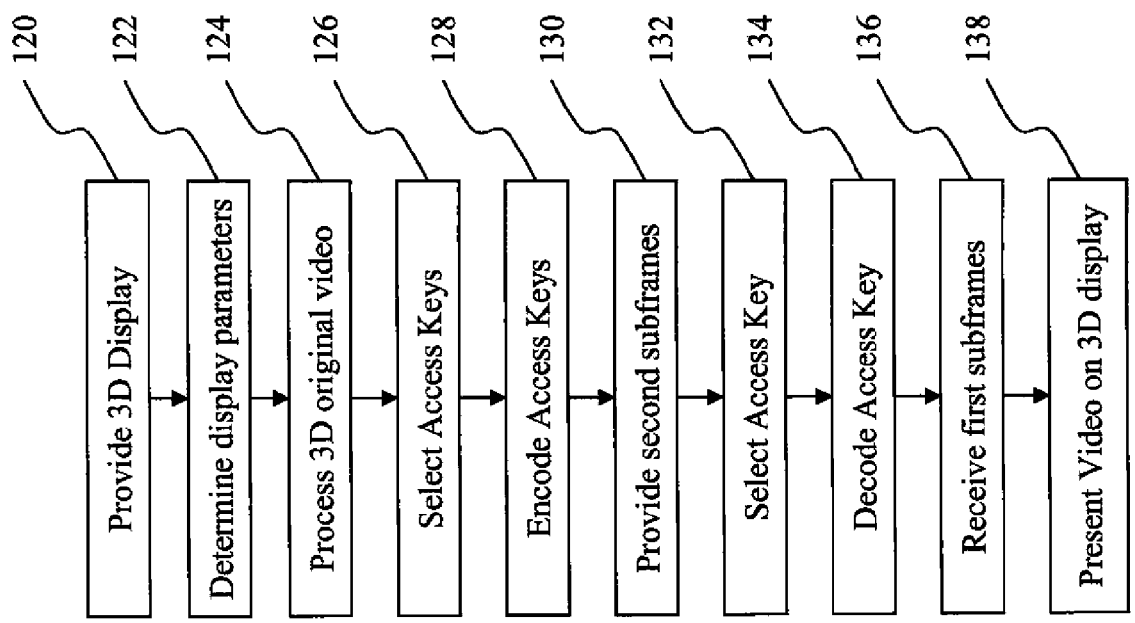
FIG. 8 is a flow chart providing the steps of an arrangement of the present invention useful for presenting multiple groups of first subframes on multiple 3D displays.

Referring to FIG. 8, it is possible to provide first subframes customized for more than one set of display parameters. A 3D display is provided 120 and its parameters 122 are determined. A 3D original video is processed 124 to provide second subframes and more than one group of first subframes, where each group of first subframes is formed with respect to a different set of display parameters. For instance, different groups of first subframes are created for low resolution displays (less than VGA resolution), medium resolution displays (e.g., VGA to HDTV resolution) and very high resolution displays (e.g., higher than HDTV resolution). These groups will, for example, be rendered to have increasing disparity, measured in pixels of offset between a first and a second perspective view, with increasing resolution. In another example, different groups of first subframes are created for a display that supports only 2 perspective views than for a display that supports 10 perspective views. An access key is selected 126 for each group such that the first subframes include a first and a second group of first subframes. Each group has a respective access key different from the access keys for each of the other groups. Each of the multiple access keys is then encoded 128 in the second subframes. The second subframes are then provided 130 to the display.

Based upon the display parameters that were determined 122 previously, the display will select 132 and decode 134 an access key. Based upon this access key, the display will then request and receive 136 the first subframes corresponding to the group of first subframes that are associated with the selected access key and present 138 a video on the 3D display that is based upon the second subframes and the group of first subframes. As such, the step of encoding the access keys 132 includes encoding multiple access keys into one or more of the second subframes. Further, the step of decoding the access key 134 requires selecting a subframe group or an access key based upon the display parameters and decoding the selected access key from the second subframes. Further the method includes selectively causing the first subframes in the respective group to be received using the second data transport. As such this method includes selecting the group of first subframes based upon a configuration of the display.

Note that in this configuration, it is also possible that some groups of first subframes include high dynamic range or expanded color gamut information. Therefore, the processing step 124 further includes processing the original video of the scene to provide the 3D video of the scene having first subframes that further include high dynamic range or expanded color gamut information. As such, presenting the first and second subframes on the image-presentation element of the display presents a 3D video of the scene with high dynamic range or an expanded color gamut when the display is capable of providing this information.

In a preferred embodiment, the image-presentation element 42 includes Organic Light Emitting Diodes (OLEDs) which are composed of small molecule or polymeric OLEDs as disclosed in but not limited to U.S. Pat. No. 4,769,292, by Tang et al., and U.S. Pat. No. 5,061,569, by VanSlyke et al. Many combinations and variations of organic light emitting materials are used to fabricate elements as known in the art.

The invention has been described in detail with particular reference to certain preferred embodiments thereof, but it will be understood that variations and modifications can be effected within the spirit and scope of the invention.

PARTS LIST 2 provide display step
4 provide video of a scene step
6 select access key step
8 encode access key step
10 provide second subframe step
12 decode access key step
14 receive first subframe step
16 provide first and second subframes step
18 video source
20 video of a scene
22 encoding processor
24 first subframes
26 second subframes
28 storage medium
30 storage medium
32 first data transport
34 decoding processor
36 second data transport
38 display
40 system
42 image-presentation element
44 subpixel
46 pixel
48 region
49 region
50 provide display step
52 process video step
54 select access key step
56 encode access key step
58 provide second subframes step
60 decode access key step
62 receive first subframe step
64 present video step
72, 72a, 72b second region
74 first region
80 acquire scene step
82 provide first subframes step
84 provide second subframes step
86 update display at first update rate step
88 update display at second update rate step
90 observe video
92a, 92b, 92c timing pulse for region with slow or no motion
94a, 94b, 94c, 94d, 94e, 94f, 94g timing pulses for regions with rapid motion
100 provide 3D display step
102 process 3D original video step
104 select key step
106 encode key step
108 provide second subframes step
110 decode access key step
112 receive first subframes step
114 present video step
120 provide 3D display step
122 determine display parameters step
124 process 3D video step
126 select multiple access keys step
128 encode each access key step
130 provide second subframes step
132 select access key step
134 decode access key step
136 receive first subframe from selected group step
138 present video step

The invention claimed is:

1. A method of presenting an enhanced video of a scene on a display with reduced motion blur, comprising:

a) providing the display with an image-presentation element;

b) processing an original video of the scene that includes a plurality of frames of data, the data in each frame representing the scene over a given time interval, to provide the enhanced video of the scene that includes first subframes that have a first input rate and second subframes that have a second input rate, wherein each first or second subframe corresponding to a respective portion of the spatial area of one of the plurality of frames and including data representing a portion of the scene, the first subframes correspond to a first region of the image-presentation element, the second subframes correspond to a second region of the image-presentation element, and the first subframes correspond to fewer than all of the subpixels of the image-presentation element;

c) selecting an access key corresponding to the first subframes;

d) encoding the access key into one or more of the second subframes;

e) using a first data transport to provide the second subframes to the display;

f) the display decoding the access key from the second subframes and selectively causing the corresponding first subframes to be received using a second data transport different from the first data transport; and g) presenting on the image-presentation element of the display the first and second subframes so that the combined presented first and second subframes reproduce the enhanced video with reduced motion blur.

2. The method of claim 1, wherein the first subframes are presented in the first region of the image-presentation element with a first update rate and the second subframes are presented in the second region of the image-presentation element with a second update rate, wherein the first update rate is greater than the second update rate.

3. The method of claim 2, wherein the first region of the image-presentation element is a subset of the second region of the image-presentation element, the first region has a corresponding total input rate, the total input rate is greater than or equal to the larger of the first input rate and the second input rate, the total input rate is greater than the second input rate, and the first update rate is greater than or equal to the total input rate.

4. The method of claim 1, wherein the processing step further includes processing the original video of the scene to provide the enhanced video of the scene having first subframes that further include high dynamic range or expanded color gamut information, and wherein presenting the first and second subframes on the display presents the enhanced video with a high dynamic range or an expanded color gamut.

5. The method of claim 1, wherein the processing step includes calculating a difference between the second subframes and the original video.

6. The method of claim 1, wherein the image-presentation element includes a plurality of subpixels and the presenting step includes providing data from the second subframes to subpixels in the first region and subsequently providing data from the first subframes to subpixels in the first region.

7. A method of presenting a 3D video of a scene on a display, comprising:

a) providing a display with an image-presentation element capable of providing a 3D image;

b) processing a 3D original video of the scene to provide the 3D video of the scene having first and second groups of first subframes that have 3D content and second subframes that have 2D content, each group of first subframes corresponding to a different set of display parameters;

c) selecting a respective, different access key corresponding to each group of first subframes;

d) encoding the respective access keys into one or more of the second subframes;

e) using a first data transport to provide the second subframes to the display;

f) the display decoding the access keys from the second subframes, selecting one of the groups of first subframes corresponding to parameters of the display and selectively causing the corresponding first subframes in the selected group to be received using a second data transport different from the first data transport; and presenting the first and second subframes on the image-presentation element of the display so that the combined presented first and second subframes reproduce the 3D video.

8. The method of claim 7, wherein the second subframes provide a first perspective view of the scene and each group of first subframes provides a respective additional perspective view of the scene.

9. The method of claim 8, wherein one of the groups of first subframes further provides a third additional perspective view of the scene.

10. The method of claim 7, wherein step f) further includes selecting the group based upon a configuration of the display.

* * * * *